United States Patent
Chen et al.

(10) Patent No.: US 9,288,180 B2
(45) Date of Patent: Mar. 15, 2016

(54) COMMUNICATION SYSTEM AND METHOD

(71) Applicant: Quanta Computer Inc., Kuei Shan Hsiang, Tao Yuan Shien (TW)

(72) Inventors: Rong-Quen Chen, Tao Yuan Shien (TW); Chun-Hsiung Fang, Tao Yuan Shien (TW); Kai-Ju Cheng, Tao Yuan Shien (TW); Chin-Yuan Ting, Tao Yuan Shien (TW); Chih-Wei Sung, Tao Yuan Shien (TW); Yu-Hsing Lin, Tao Yuan Shien (TW); Ying-Jie Wang, Tao Yuan Shien (TW); Chen-Hsuan Weng, Tao Yuan Shien (TW); Hsin-Lun Hsieh, Tao Yuan Shien (TW); Chih-Yuan Huang, Tao Yuan Shien (TW); Yuan-Ping Chang, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 107 days.

(21) Appl. No.: 14/050,969

(22) Filed: Oct. 10, 2013

(65) Prior Publication Data

US 2014/0348076 A1 Nov. 27, 2014

(30) Foreign Application Priority Data

May 27, 2013 (TW) .............................. 102118578 A

(51) Int. Cl.
*H04L 29/12* (2006.01)
*H04W 76/02* (2009.01)

(52) U.S. Cl.
CPC ........... *H04L 61/2007* (2013.01); *H04W 76/02* (2013.01); *H04W 76/022* (2013.01)

(58) Field of Classification Search
USPC .................. 370/401, 389, 392, 328, 310, 329
See application file for complete search history.

(56) References Cited

U.S. PATENT DOCUMENTS

| | | | |
|---|---|---|---|
| 7,970,765 B1* | 6/2011 | Olsen | H04L 12/4679 707/737 |
| 8,929,265 B2 | 1/2015 | Faccin | |
| 2010/0014536 A1 | 1/2010 | Lin et al. | |
| 2011/0002271 A1* | 1/2011 | Ogata | H04L 67/34 370/328 |
| 2013/0311987 A1* | 11/2013 | Liekens | G06F 9/445 717/178 |
| 2013/0318341 A1* | 11/2013 | Bagepalli | H04L 63/166 713/151 |

FOREIGN PATENT DOCUMENTS

| | | |
|---|---|---|
| TW | 200913549 | 3/2009 |
| TW | 201006194 | 2/2010 |

OTHER PUBLICATIONS

Taiwanese language office action dated Feb. 25, 2015.
English language translation of abstract of TW 200913549 (published Mar. 16, 2009).
English language translation of abstract of TW 201006194 (published Feb. 1, 2010).

\* cited by examiner

*Primary Examiner* — Habte Mered
*Assistant Examiner* — Rownak Islam
(74) *Attorney, Agent, or Firm* — McClure, Qualey & Rodack, LLP

(57) ABSTRACT

A communication system and method are provided. In the communication system, a first electrical device has an end point which is configured to connect to a plurality of 3G dongles, wherein the 3G dongles have different IP addresses; a cloud server integrates the IP addresses to generate an integrated IP address when the cloud server detects that the first electrical device is connected to the 3G dongles; and a second electrical device transmits data packets with the first electrical device via the integrated IP address through the cloud server.

10 Claims, 5 Drawing Sheets

COMMUNICATION SYSTEM AND METHOD

CROSS REFERENCE TO RELATED APPLICATIONS

This Application claims priority of Taiwan Patent Application No. 102118578, filed on May 27, 2013, the entirety of which is incorporated by reference herein.

BACKGROUND OF THE INVENTION

1. Field of the Invention

The disclosure is related to communication transmission, and, more particularly, to the transmission of data packets by integrating multiple bands for data transmission.

2. Description of the Related Art

Recently, because of the rapid development of wireless communications, portable devices such as smartphones, personal digital assistants, and tablet PCs are widely available, and have become more and more technically advanced and multifunctional. Due to the increased convenience and functionality of the devices, these devices have become necessities of life.

The video call is a popular communication technology in recently produced electrical devices. Such video calls are connected by the Transmission Control Protocol/Internet Protocol (TCP/IP) network or a network provided by the telecommunications operator for transmitting audio and video data. When a user communicates with a remote user, the user can see the image of the remote user, and the user also can process the video conference with the remote user by the video call.

In a traditional video conference, video data packets are usually transmitted by a cable network. However, because of the rapid development of wireless communications technology, there are increasingly greater requirements for higher image quality and higher image resolution on the part of the video device. Therefore, the use of multiple bands to transmit a higher image resolution and higher image quality of video data may be an important subject.

BRIEF SUMMARY OF THE INVENTION

An embodiment of the invention provides a communication system, comprising: a first electrical device, having an end point which is configured to connect to a plurality of 3G dongles, wherein the 3G dongles have different IP addresses; a cloud server, integrating the IP addresses to generate an integrated IP address when the cloud server detects that the first electrical device is connected to the 3G dongles; and a second electrical device, transmitting data packets with the first electrical device by the integrated IP address through the cloud server.

An embodiment of the invention provides a communication method, comprising: detecting whether a first electrical device is connected to a plurality of 3G dongles, wherein the 3G dongles have different IP addresses; setting up an agent module in a cloud server when it is detected that the first electrical device is connected to the 3G dongles; integrating, via the agent module, the IP addresses to generate an integrated IP address; and transmitting data packets between the first electrical device and the second electrical device by the integrated IP address through the cloud server.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
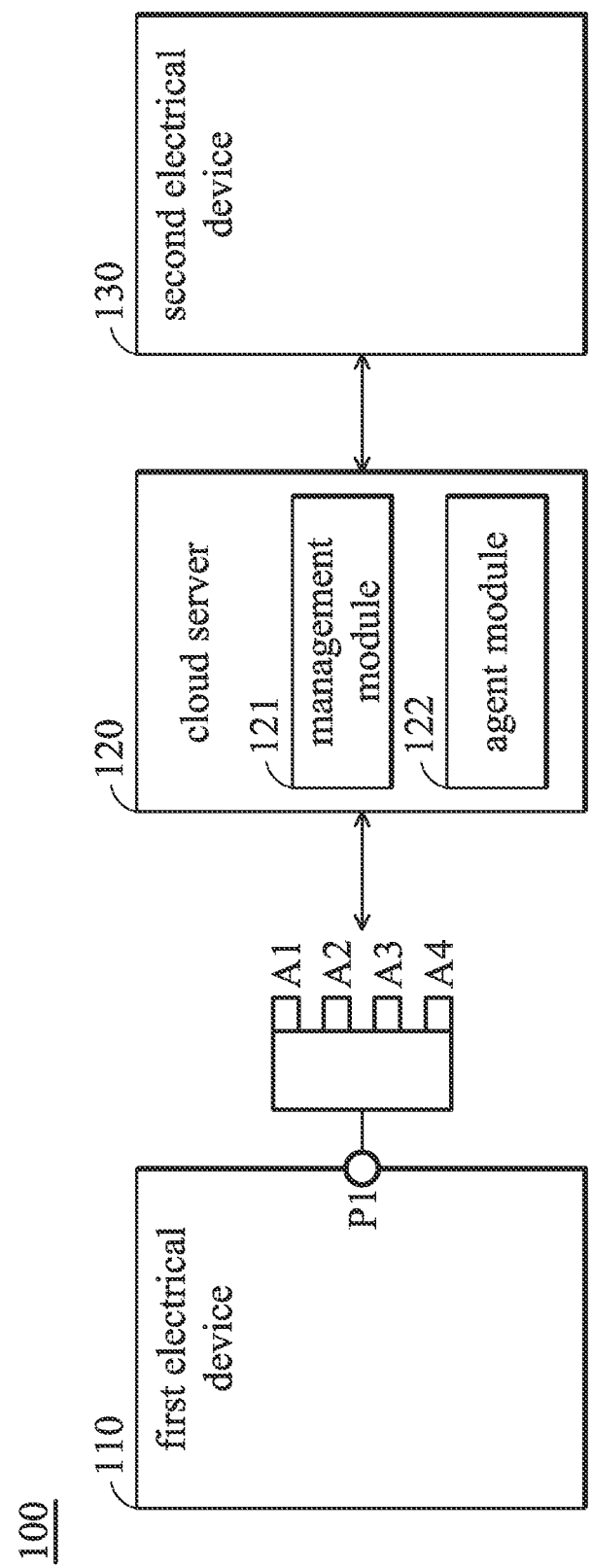
FIG. 1 is schematic diagram illustrating the communication system 100 according to an embodiment of the invention.

FIG. 1 is schematic diagram illustrating the communication system 100 according to an embodiment of the invention. In FIG. 1, the data transmission system 100 comprises a first electrical device 110, a cloud server 120, and a second electrical device 130. In an embodiment of the invention, the first electrical device 110 is an electrical device with video functionality, and the second electrical device 130 is another electrical device with video functionality. The first electrical device 110 and the second electrical device 130 can process a video conference through a cable or wireless network. Note that while the first electrical device 110 and the second electrical device 130 have been described by way of example in the embodiment, it is to be understood that the invention is not limited thereto. Those who are skilled in this technology can apply any number of electrical devices for data-packet transmission according to the embodiment.

In an embodiment of the invention, the first electrical device 110 has an end point P1 for connecting to a plurality of 3G dongles A1-A4, wherein the plurality of 3G dongles A1-A4 are configured to provide different network frequency bands for the first electrical device 110, therefore, the first electrical device 110 can connect with a 3G network via multiple bands and transmit data packets with the cloud server through a wireless transmission technology. In addition, each of the 3G dongles A1-A4 has a different IP address. In an embodiment of the invention, the second electrical device 130 can transmit data packets with the cloud server 120 by wireless or cable transmission. Note that the 3G dongles A1-A4 have been described by way of example in the embodiment, but it is to be understood that the invention is not limited thereto. Those who are skilled in this technology can apply any number of 3G dongles for different frequency band requirements according to the embodiment of the invention.

In an embodiment of the invention, when the cloud server detects that the first electrical device 110 is connected to the 3G dongles A1-A4, the management module 121 of the cloud server 120 may establish an agent module 122 in the cloud server 120. In an embodiment of the invention, when there are many electrical devices, the management module 121 may firstly determine whether there is a need to establish the agent module 122 for the electrical device. For example, when the electrical device is only connected to a 3G dongle or a cable network, the management module 121 may not establish the agent module 122. When the management module 121 needs to establish the agent module 122, the management module 121 may establish an agent module 122 corresponding to different electrical devices in the cloud server 120. In an embodiment of the invention, the agent module 122 may integrate the different IP addresses of the 3G dongles A1-A4 to generate an integrated IP address. Generally, when the first electrical device 110 is connected to many 3G dongles, the second electrical device 130 may detect many IP addresses because each of the 3G dongles has a different IP address.

Then, the second electrical device 130 can't determine how many electrical devices are in the network. Therefore, if the different IP addresses of the 3G dongles A1-A4 are integrated into an integrated IP address, when the second electrical device 130 detects the electrical device in the network, the second electrical device 130 may only detect the first electrical device 110 with the integrated IP address. The error of determining that there are many electrical devices because of the detection of many IP addresses can be avoided. Therefore, the second electrical device 130 can communicate with the first electrical device 110 by the integrated IP address through the cloud server 120. In addition, when the second electrical device 130 transmits data packets back to the first electrical device 110, the agent module 122 may also recover the original different IP addresses of the 3G dongles A1-A4 from the integrated IP address, and the data packets can be transmitted back to the first electrical device 110 by the 3G dongles A1-A4.

In an embodiment of the invention, the agent module 122 may generate a list for recording the port information of transmitting the different messages and video-stream data, wherein the different messages and video-stream data comprise: the transmission data of the Session Initiation Protocol (SIP), and the transmission data of the Real-time Transport Protocol (RTP) and the Real-time Transport Control Protocol (RTCP). In addition, the port information comprises information about the ports for inputting or outputting different messages and video-stream data. For example, the end point P1 uses the port 5000 and the agent module 122 uses the port 5001 for transmitting or receiving messages and information; the end point P1 uses port 1000 and the agent module 122 uses the port 1005 for transmitting or receiving the video data; the end point P1 uses port 2000 and the agent module 122 uses the port 2005 for transmitting or receiving the audio data. Therefore, when the first electrical device 110 and the second electrical device 130 transmit the data packet, the first electrical device 110 and the second electrical device 130 may know what types of data packets, such as message packets, video packets, and audio packets, are transmitted and received by the different ports.

Figure 2:
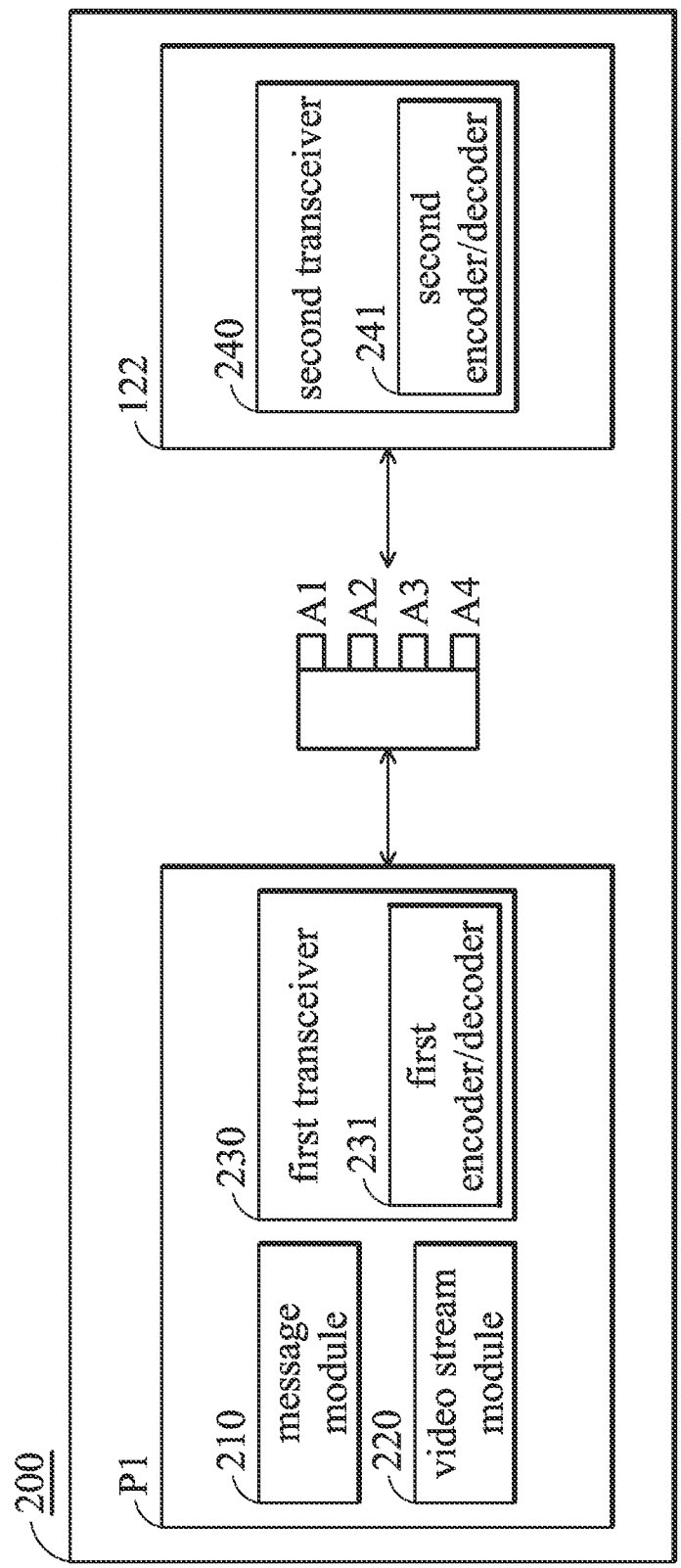
FIG. 2 is schematic diagram illustrating the virtual client device 200 according to an embodiment of the invention.

In an embodiment of the invention, the end point P1, 3G dongles A1-A4, and agent module 122 can be integrated into a virtual client device 200. FIG. 2 is schematic diagram illustrating the virtual client device 200 according to an embodiment of the invention. The end point P1 comprises a message module 210, a video stream module 220, and a first transceiver 230. The agent module 122 comprises a second transceiver 240. In an embodiment of the invention, the message module 210 is configured to execute the Session Initiation Protocol (SIP) for setting up communication between the first electrical device 110 and the second electrical device 130. The video stream module 220 is configured to execute the transmission data of the Real-time Transport Protocol (RTP) and the Real-time Transport Control Protocol (RTCP) for transmitting the video-stream data. The first transceiver 230 transmits or receives the data packets with the second transceiver 240 of the agent module 122 via the 3G dongles A1-A4.

Figure 3:
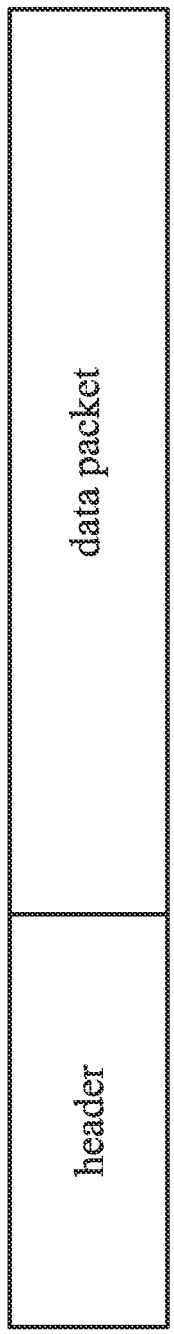
FIG. 3 is schematic diagram illustrating the application data packet according to an embodiment of the invention.

In an embodiment of the invention, the first transceiver 230 comprises a first encoder/decoder 231. The first encoder/decoder 231 may add a header to the data packet, and encode the data packet with the header into an application data packet. And then, the application data packet is transmitted to the agent module 122 by the 3G dongles A1-A4, wherein the header comprises synchronization information and switching information which are configured to inform the agent module 122 of the synchronization state of end point P1 and the agent module 122 and related IP address information and port information. FIG. 3 is schematic diagram illustrating the application data packet according to an embodiment of the invention. In FIG. 3, the application data packet comprises two parts: one part is header and the other part is data packet. In an embodiment of the invention, the second transceiver 240 comprises a second encoder/decoder 241. The second encoder/decoder 241 may decode the application data packet transmitted from the end point P1 and set up the list according to the header. In addition, the second transceiver 240 may remove the header of the decoded application data packet and transmit the data packets to the second electrical device 130. When the second electrical device 130 transmits the data packet back to the first electrical device 110, the second transceiver 240 may add a new header to the data packets, and the second encoder/decoder 241 may encode the data packets with the header to the application data packet. And then, the application data packet is transmitted to the end point P1 by the 3G dongles A1-A4. Then, the end point P1 decodes the application data packet transmitted from the agent module 122 via the first encoder/decoder 231.

Figure 4:
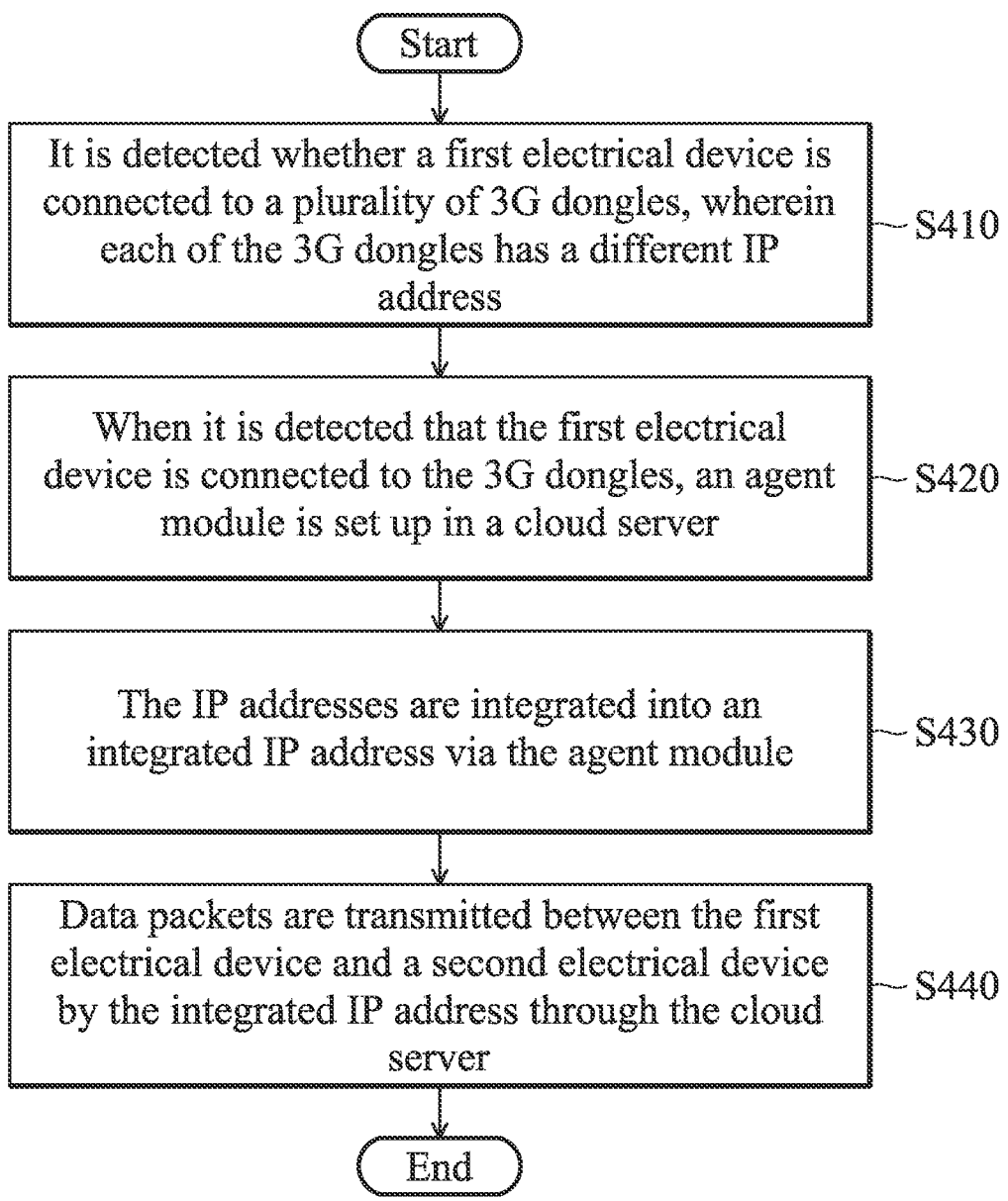
FIG. 4 is a flowchart of a communication method according to an embodiment of the invention.

FIG. 4 is a flowchart of a communication method according to an embodiment of the invention. Firstly, in step S410, it is detected whether a first electrical device is connected to a plurality of 3G dongles, wherein each of the 3G dongles has a different IP address. In step S420, when it is detected that the first electrical device is connected to the 3G dongles, an agent module is set up in a cloud server. In step S430, the IP addresses are integrated into an integrated IP address via the agent module. In step S440, data packets are transmitted between the first electrical device and a second electrical device by the integrated IP address through the cloud server. In an embodiment of the invention, the method further comprises the second electrical device transmitting the data packets back to the first electrical device; the agent module may recover the original different IP addresses of the 3G dongles from the integrated IP address, and the data packets are transmitted back to the first electrical device by the 3G dongles.

Figure 5:
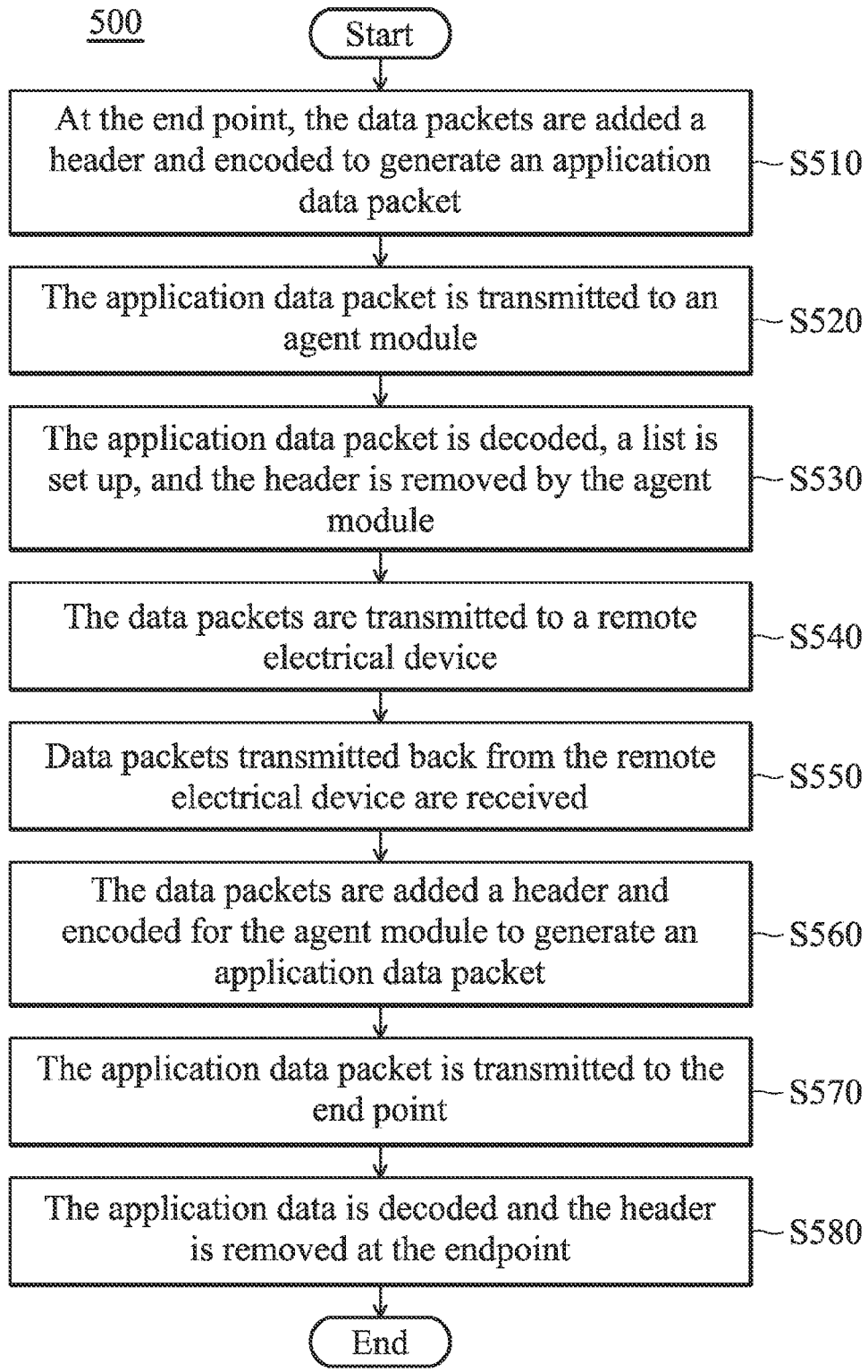
FIG. 5 is a flowchart of a communication method of a virtual client device according to an embodiment of the invention.

FIG. 5 is a flowchart of a communication method of a virtual client device according to an embodiment of the invention, wherein the method is applied to a structure which comprises an end point, a plurality of 3G dongles, and an agent module. Firstly, in step S510, at the end point, the data packets are added a header and encoded to generate an application data packet. In step S520, the application data packet is transmitted to an agent module. In step S530, the application data packet is decoded, a list is set up, and the header is removed by the agent module. In step S540, the data packets are transmitted to a remote electrical device. In step S550, data packets transmitted back from the remote electrical device are received. In step S560, the data packets are added a header and encoded for the agent module to generate an application data packet. In step S570, the application data packet is transmitted to the end point. In step S580, the application data is decoded and the header is removed at the endpoint.

In a traditional video conference, the video data packets are usually transmitted by a cable network. However, because of the rapid development of wireless communications, there are increasing requirements for video devices to have higher image quality and higher image resolution. Therefore, according to the method, the electrical device can use multiple bands to transmit data packets by connecting a plurality of 3G dongles for the user to process a video conference with better quality and efficiency. In addition, when the electrical device is connected to many 3G dongles, the remote electrical device may detect many IP addresses because each of the 3G dongles has a different IP address. When this happens, the remote electrical device cannot determine how many electrical devices are in the network. Therefore, according to the embodiment of the method, if the different IP addresses of the 3G dongles are integrated into an integrated IP address, when the remote electrical device detects the electrical device in the network, the remote electrical device may only detect the electrical device with the integrated IP address. The error that results from determining that many electrical devices exist because of the detection of many IP addresses may not occur.

The method, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication system, comprising:
    a first electrical device, having an end point which is configured to simultaneously connect a plurality of 3G dongles to obtain multiple network frequency bands to transmit data packets in multiple network frequencies, wherein each of the 3G dongles has a different IP address;
    a cloud server, integrating the different IP addresses to generate an integrated IP address, when the cloud server detects the first electrical device is connected to the plurality of 3G dongles;
    a second electrical device, transmitting the data packets with the first electrical device by the integrated IP address through the cloud server; and
    a management module, setting up an agent module in the cloud server when the cloud server detects that the first electrical device is connected to the plurality of 3G dongles,
    wherein the data packets may be added a header at the end point, the data packets with the header are encoded into an application data packet and the application data packet is transmitted to the agent module, wherein the header comprises synchronization information and switching information.

2. The communication system of claim 1, wherein the agent module is configured to integrate the IP address to generate the integrated address and generate a list.

3. The communication system of claim 2, wherein the list comprises port information.

4. The communication system of claim 1, wherein when the second electrical device transmits the data packets back to the first electrical device, the agent module may recover the different IP addresses of the 3G dongles from the integrated IP address and the data packets are transmitted to the first electrical device by the 3G dongles.

5. The communication system of claim 1, wherein the application data packet is decoded after the agent module receives the application data packet, and the decoded application data packet is transmitted to the second electrical device.

6. A communication method, comprising:
    detecting whether a first electrical device is simultaneously connected to a plurality of 3G dongles to obtain multiple network frequency bands to transmit data packets in multiple network frequencies, wherein each of the 3G dongles has a different IP address;
    setting up an agent module in a cloud server when it is detected that the first electrical device is connected to the plurality of 3G dongles;
    adding a header to the data packets at an end point;
    encoding the data packets with the header into an application data packet; and
    transmitting the application data packet to the agent module, wherein the header comprises synchronization information and switching information;
    integrating, via the agent module, the different IP addresses to generate an integrated IP address; and
    transmitting the data packets between the first electrical device and the second electrical device via the integrated IP address through the cloud server.

7. The communication method of claim 6, wherein the agent module is configured to integrate the IP address to generate the integrated address and generate a list.

8. The communication method of claim 7, wherein the list comprises port information.

9. The communication method of claim 6, further comprising:
    recovering, via the agent module, the different IP addresses of the 3G dongles from the integrated IP address and transmitting the data packets to the first electrical device by the 3G dongles, when the second electrical device transmits the data packets back to the first electrical device.

10. The communication method of claim 6, further comprising:
    decoding the application data packet after the agent module receives the application data packet, and
    transmitting the decoded application data packet to the second electrical device.

* * * * *